United States Patent
Li et al.

(10) Patent No.: US 10,470,564 B2
(45) Date of Patent: Nov. 12, 2019

(54) SUPPORT DEVICE

(71) Applicant: Compal Electronics, Inc., Taipei (TW)

(72) Inventors: Ching-Hua Li, Taipei (TW); Li-Fang Chen, Taipei (TW); Chen-Hsien Cheng, Taipei (TW); I-Chen Chen, Taipei (TW); I-Lung Chen, Taipei (TW); Wei-Ning Chai, Taipei (TW); Cheng-Min Chen, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 16/019,274

(22) Filed: Jun. 26, 2018

(65) Prior Publication Data

US 2019/0281977 A1  Sep. 19, 2019

(30) Foreign Application Priority Data

Mar. 19, 2018 (TW) .............................. 107109270 A

(51) Int. Cl.
*A47B 23/06* (2006.01)
*A47B 23/04* (2006.01)
*F16M 11/20* (2006.01)
*H04R 1/02* (2006.01)
*H04R 1/40* (2006.01)

(52) U.S. Cl.
CPC .............. *A47B 23/06* (2013.01); *A47B 23/04* (2013.01); *F16M 11/2021* (2013.01); *H04R 1/025* (2013.01); *H04R 1/403* (2013.01); *A47B 2023/049* (2013.01); *F16M 2200/021* (2013.01); *H04R 2201/025* (2013.01)

(58) Field of Classification Search
None
See application file for complete search history.

(56) References Cited

U.S. PATENT DOCUMENTS

| | | | | |
|---|---|---|---|---|
| 4,621,782 | A | * | 11/1986 | Carlson .................. F16M 11/10 248/183.3 |
| 8,827,227 | B2 | | 9/2014 | Nagaoka et al. |
| 2003/0173476 | A1 | * | 9/2003 | Masuda ................. F16M 11/10 248/163.1 |
| 2004/0052393 | A1 | * | 3/2004 | Bronson, III .......... H04R 1/323 381/345 |
| 2013/0186682 | A1 | * | 7/2013 | Gallagher ............ F16M 11/105 174/560 |

(Continued)

FOREIGN PATENT DOCUMENTS

TW          465702 U    11/2001

*Primary Examiner* — Qin Zhu

(57) ABSTRACT

A support device adapted to support an electronic device is provided. The electronic device has a display surface. The support device includes a base, a support frame, and at least one torque fixing assembly. The base includes a first arc surface portion. The support frame includes a second arc surface portion opposite to the first arc surface portion and an axis. The support frame rotates along the axis such that the second arc surface portion slides relative to the first arc surface portion and the electronic device switches between a first use state and a second use state. The torque fixing assembly is disposed at the first arc surface portion and the second arc surface portion. When the second arc surface portion slides relative to the first arc surface portion, the second arc surface portion rubs against the torque fixing assembly and torque is generated.

13 Claims, 6 Drawing Sheets

(56) References Cited

U.S. PATENT DOCUMENTS

| | | | |
|---|---|---|---|
| 2015/0239404 A1* | 8/2015 | Lee | F16M 11/041 248/284.1 |
| 2017/0139446 A1* | 5/2017 | Lan | G06F 1/1681 |
| 2018/0080596 A1* | 3/2018 | Mills | F16M 11/10 |

* cited by examiner

SUPPORT DEVICE

FIELD OF THE INVENTION

The present invention relates to a support device, and more particularly to a support device adapted to support an electronic device.

BACKGROUND OF THE INVENTION

With the evolution of technology, most of the electronic devices on the market have a thin and light appearance and are easy to carry. Moreover, the electronic device adopts a touch screen so that the electronic device can be operated by inputting commands through the touch screen. Since users cannot continuously operate the electronic device in a handheld manner for a long period of time, a support device that can fix the electronic device is needed so that the users can operate the electronic device in a hands-free state (such as being placed on a desktop).

However, a structure of a conventional support device used for supporting the electronic device is too complicated. Under frequent use, it can be quite easily damaged and unable to be used. In addition, under the circumstance of complex structures, the difficulty to the users in operating the support device is thus also increased. Therefore, how to improve the above-mentioned problems is really the focus of the relevant people in the field.

SUMMARY OF THE INVENTION

One of the objectives of the present invention is to provide a support device, whose structure is simple. When an electronic device is placed at the support device of the present invention, an angle between a display surface of the electronic device and a user is quickly adjusted in a rotating manner Other objectives and advantages of the present invention can be further understood from the technical features disclosed by the present invention.

In order to achieve one or a portion of or all of the objectives or other objectives, the present invention provides a support device adapted to support an electronic device. The electronic device has a display surface. The support device includes a base, a support frame, and at least one torque fixing assembly. The base includes a first arc surface portion. The support frame is adapted to support the electronic device. The support frame includes a second arc surface portion opposite to the first arc surface portion and an axis. The support frame rotates along the axis such that the second arc surface portion slides relative to the first arc surface portion and the electronic device switches between a first use state and a second use state. The torque fixing assembly is disposed at the first arc surface portion and the second arc surface portion. When the second arc surface portion slides relative to the first arc surface portion, the second arc surface portion rubs against the torque fixing assembly and torque is generated.

In an embodiment of the present invention, the torque fixing assembly includes a first locking member, a second locking member, and a friction member. The friction member is located between the first locking member and the second arc surface portion. The first arc surface portion is located between the second locking member and the second arc surface portion. The first locking member passes through the friction member and the second arc surface portion and is locked to the second locking member, which passes through the first arc surface portion, so that the friction member abuts against the second arc surface portion and the first arc surface portion abuts against the second arc surface portion.

In an embodiment of the present invention, the second arc surface portion includes at least one first through-chute. The first locking member passes through the friction member and the first through-chute and is locked to the second locking member. The first through-chute has a first abutment end and a second abutment end. When in the first use state, the first abutment end abuts against the first locking member. When in the second use state, the second abutment end abuts against the first locking member.

In an embodiment of the present invention, the second arc surface portion further includes at least one frame-shaped buffer member. The frame-shaped buffer member is disposed between the first through-chute and the friction member. The first locking member passes through the friction member, the frame-shaped buffer member and the first through-chute and is locked to the second locking member.

In an embodiment of the present invention, a quantity of the at least one torque fixing assembly is two, a quantity of the at least one first through-chute is two, and a quantity of the at least one frame-shaped buffer member is two. The first through-chutes are disposed at two opposite sides of the second arc surface portion, respectively. The torque fixing assemblies are respectively disposed at the corresponding first through-chute. The frame-shaped buffer members are respectively located between the corresponding torque fixing assembly and the corresponding first through-chute.

In an embodiment of the present invention, the support device further includes a fixing assembly. The fixing assembly is disposed at the first arc surface portion and the second arc surface portion. The fixing assembly is located at a side of the torque fixing assembly. The support frame is movably fixed to the base through the fixing assembly.

In an embodiment of the present invention, the fixing assembly includes a first fixing member and a second fixing member. The first arc surface portion and the second arc surface portion are located between the first fixing member and the second fixing member. The first fixing member is disposed through the second arc surface portion and is fixed to each other with the second fixing member which is disposed through the first arc surface portion.

In an embodiment of the present invention, the first arc surface portion includes a second through-chute. The second fixing member passes through the second through-chute and is fixed to each other with the first fixing member. When the support frame rotates along the axis such that the second arc surface portion slides relative to the first arc surface portion, the first fixing member, which is disposed through the second arc surface portion, drives the second fixing member to move along the second through-chute.

In an embodiment of the present invention, the support device further includes a buffer member. The buffer member is disposed between the second through-chute of the first arc surface portion and the second arc surface portion. The second fixing member of the fixing assembly passes through the second through-chute and the buffer member and is fixed to each other with the first fixing member.

In an embodiment of the present invention, the support frame further includes a support portion and a bearing portion. The second arc surface portion and the bearing portion are connected to two opposite sides of the support portion, respectively. A part of the torque fixing assembly is located between the support portion and the second arc surface portion. The support portion is used for supporting the electronic device in a first direction. The bearing portion is used for bearing the electronic device in a second direction. The first direction and the second direction are not parallel to each other.

In an embodiment of the present invention, when the support frame is in the first use state, an angle between the display surface and the base is a first angle. When in the second use state, an angle between the display surface of the electronic device and the base switches from the first angle to a second angle.

In an embodiment of the present invention, the base further includes a first speaker, which is correspondingly disposed at the first arc surface portion.

In an embodiment of the present invention, the support frame further includes a second speaker, which is correspondingly disposed at the second arc surface portion.

In an embodiment of the present invention, when the support frame and the base overlap each other without being staggered, the first speaker and the second speaker are both hidden without being exposed.

In an embodiment of the present invention, when the support frame rotates along the axis such that the first arc surface portion and the second arc surface portion are staggered to each other, at least one of the first speaker and the second speaker is exposed.

In the support device of the embodiment of the present invention, the base has the first arc surface portion, and the support frame has the second arc surface portion. When the electronic device is placed at the support frame, in response to the user's operation, the support frame is configured to rotate along the axis such that the second arc surface portion slides relative to the first arc surface portion and the electronic device switches between different use states. In addition, through the torque fixing assembly disposed at the first arc surface portion and the second arc surface portion, the second arc surface portion is configured to rub against the torque fixing assembly to generate torque when sliding relative to the first arc surface portion, so as to adjust the angle between the display surface of the electronic device and the user. The support device of the embodiment of the present invention has a simple structure and is easy for the users to operate. Under the circumstance of a simple structure, the service life is also greatly improved.

In order that the above and other objectives, features, and advantages of the present invention can be more clearly and easily understood, the following preferred embodiments in conjunction with the accompanying drawings are described in detail as follows.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The foregoing and other technical contents, features, and effects of the present invention will be clearly presented in the following detailed description of preferred embodiments with reference to the drawings. The directional terms mentioned in the following embodiments, such as upper, lower, left, right, front or rear, etc., are only with reference to the direction of the accompanying drawings. Accordingly, the directional terms used are for illustration and are not intended to limit the invention.

Figure 1:
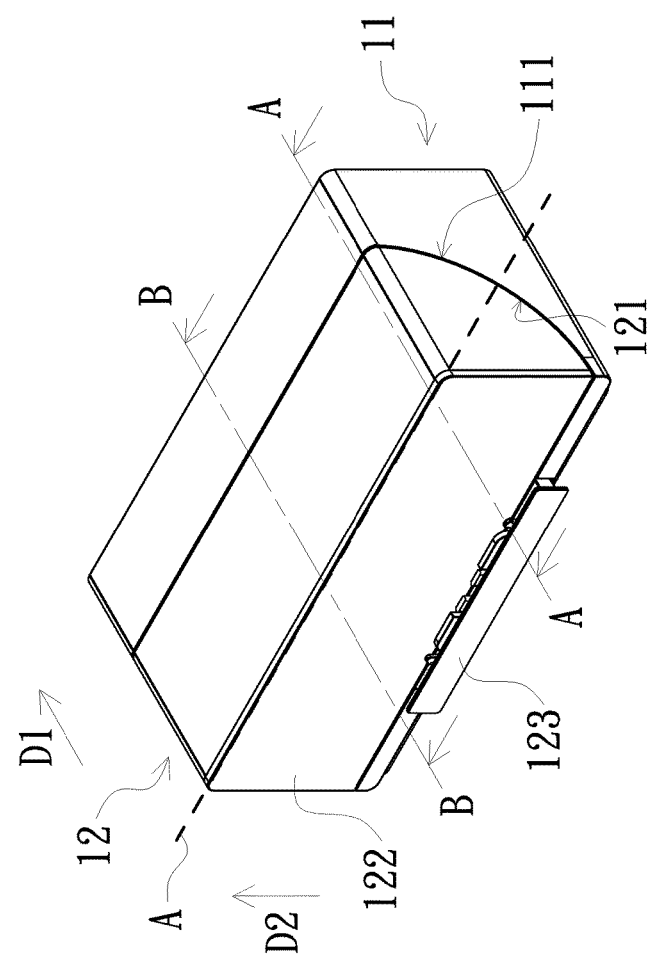
FIG. 1 is a schematic diagram of an exterior structure of a support device according to an embodiment of the present invention.
Figure 2:
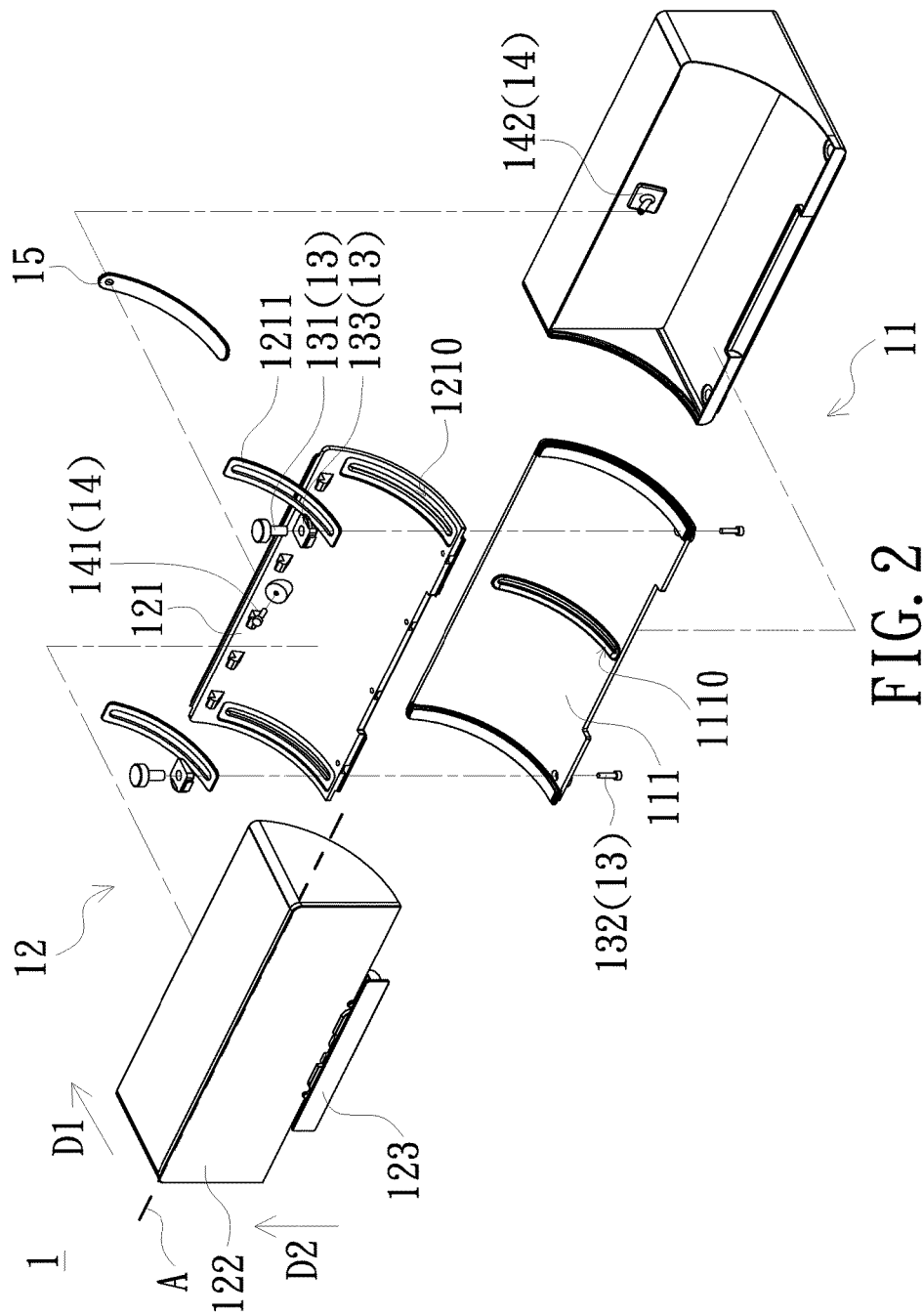
FIG. 2 is a schematic exploded view of elements of the support device shown in FIG. 1.
Figure 3:
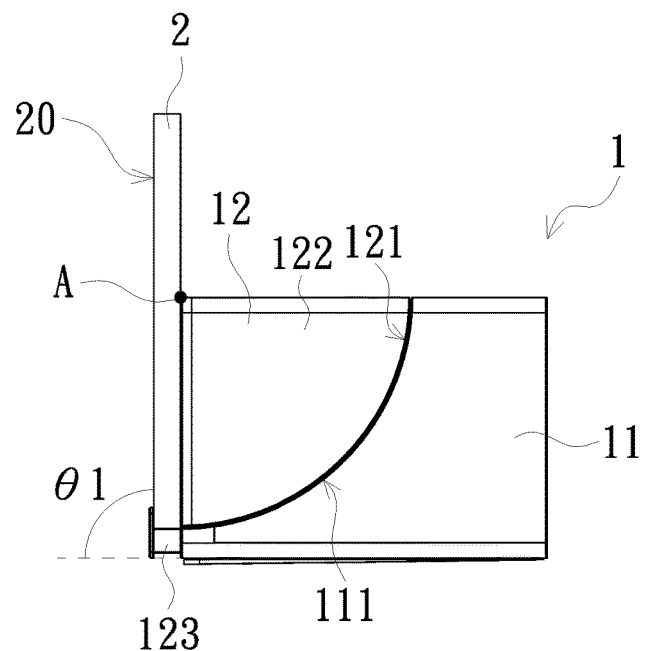
FIG. 3 is a schematic structural diagram of the support device shown in FIG. 1 in a use state.
Figure 4:
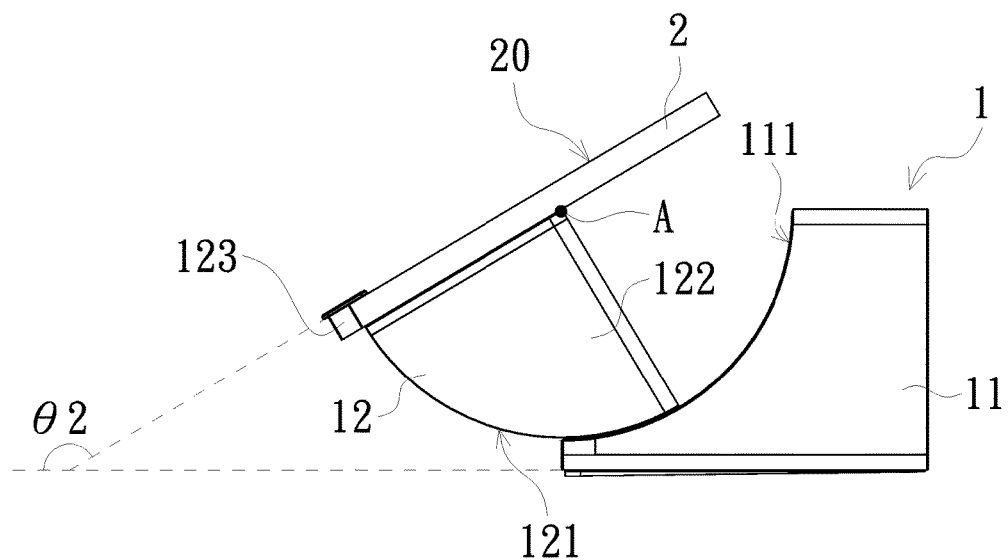
FIG. 4 is a schematic structural diagram of the support device shown in FIG. 2 in another use state.

FIG. 1 is a schematic diagram of an exterior structure of a support device according to an embodiment of the present invention. FIG. 2 is a schematic exploded view of elements of the support device shown in FIG. 1. FIG. 3 is a schematic structural diagram of the support device shown in FIG. 1 in a use state. FIG. 4 is a schematic structural diagram of the support device shown in FIG. 2 in another use state. As shown in FIG. 1 to FIG. 4, a support device 1 of the present embodiment includes a base 11, a support frame 12, and at least one torque fixing assembly 13. The base 11 includes a first arc surface portion 111. The support frame 12 includes a second arc surface portion 121 opposite to the first arc surface portion 111 and an axis A. When an electronic device 2 is placed on the support frame 12, in response to the user's operation, the support frame 12 rotates along the axis A such that the second arc surface portion 121 slides relative to the first arc surface portion 111 of the base 11 and the electronic device 2 switches between a first use state and a second use state. The torque fixing assembly 13 is placed at the first arc surface portion 111 and the second arc surface portion 121. When the second arc surface portion 121 of the support frame 12 slides relative to the first arc surface portion 111 of the base 11, the second arc surface portion 121 rubs against the torque fixing assembly 13 and torque is generated, so as to adjust an angle between a display surface 20 of the electronic device 2 and the base 11. As shown in FIG. 3, when in the first use state, an angle between the display surface 20 of the electronic device 2 and the base 11 is a first angle $\theta 1$. In the present embodiment, the first angle $\theta 1$ is, for example, 90 degrees. That is, a use state of the electronic device 2 is in a viewing mode. The users can view image pictures displayed by the display surface 20 with a better viewing angle. As shown in FIG. 4, when in the second use state, an angle between the display surface 20 of the electronic device 2 and the base 11 is switched from the first angle $\theta 1$ to a second angle $\theta 2$. In the present embodiment, the second angle $\theta 2$ is, for example, 150 degrees. That is, a use state of the electronic device 2 is in a touch mode. The users can touch and operate the electronic device under this use state.

It is only one of the embodiments of the present invention that, in the present embodiment, when in the first use state, the first angle $\theta 1$ between the display surface 20 of the electronic device 2 and the base 11 is 90 degrees. The present invention is not limited thereto. The first angle $\theta 1$ can be adjusted to an angle suitable for the users' viewing in accordance with demands of actual situation through the torque generated between the support frame 12 and the torque fixing assembly 13. It is only one of the embodiments of the present invention that, in the present embodiment, when in the second use state, the second angle θ2 between the display surface 20 of the electronic device 2 and the base 11 is 150 degrees. The present invention is not limited thereto. The second angle θ2 can be adjusted to an angle suitable for the users' touch operation in accordance with demands of actual situation through the torque generated between the support frame 12 and the torque fixing assembly 13. In addition, in the present embodiment, the base 11 is, for example, a docking station adapted to be connected to the electronic device 2, so that the function of the electronic device 2 can be expanded. The docking station is equipped with an expandable hard disk, an expandable graphics processor, and input/output ports and other electronic components. In the present embodiment, the electronic device 2 is, for example, a tablet computer or a smart phone, but the present invention is not limited thereto.

The following further describes other detailed structures of the support device 1 of the present embodiment.

Figure 5:
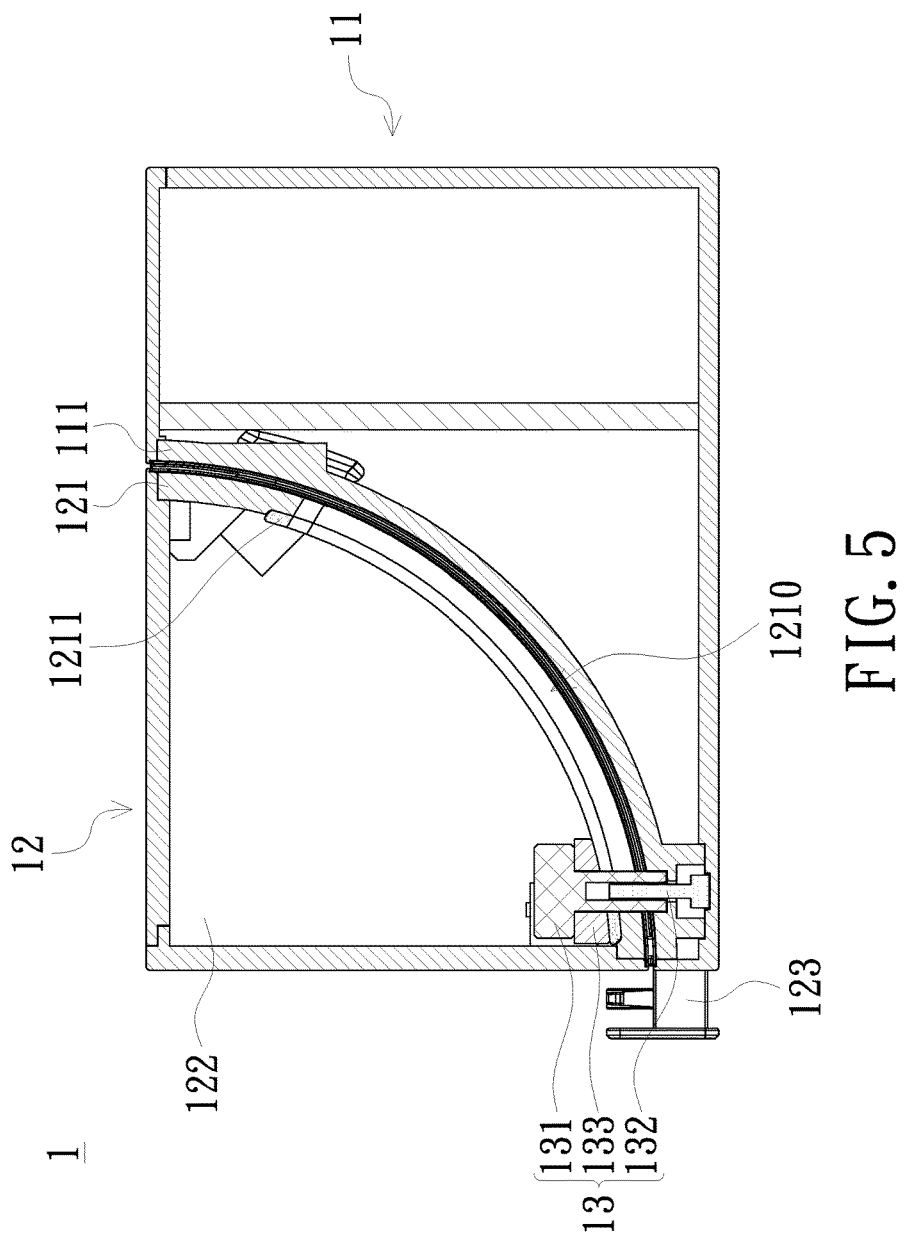
FIG. 5 is a schematic cross-sectional view taken along line A-A shown in FIG. 1.

FIG. 5 is a schematic cross-sectional view taken along line A-A shown in FIG. 1. As shown in FIG. 1, FIG. 2 and FIG. 5, the torque fixing assembly 13 of the present embodiment includes a first locking member 131, a second locking member 132, and a friction member 133. In the present embodiment, the friction member 133 is located between the first locking member 131 and the second arc surface portion 121 of the support frame 12. The first arc surface portion 111 of the base 11 is located between the second locking member 132 and the second arc surface portion 121 of the support frame 12. The first locking member 131 passes through the friction member 133 and the second arc surface portion 121 and is locked to the second locking member 132 which passes through the first arc surface portion 111. With the first locking member 131 being locked to the second locking member 132, the friction member 133 and the second arc surface portion 121 of the support frame 12 are configured to abut against each other, and the first arc surface portion 111 of the base 11 is configured to abut against the second arc surface portion 121 of the support frame 12. Under such a structural design, when the second arc surface portion 121 of the support frame 12 slides relative to the first arc surface portion 111 of the base 11, the second arc surface portion 121 rubs against the friction member 133 of the torque fixing assembly 13 and torque is generated.

As shown in FIG. 1 to FIG. 5, the second arc surface portion 121 of the present embodiment includes at least one first through-chute 1210. In the present embodiment, the first locking member 131 of the torque fixing assembly 13 passes through the friction member 133 and the first through-chute 1210 of the second arc surface portion 121 and is locked to the second locking member 132. In addition, the first through-chute 1210 has a first abutment end E1 and a second abutment end E2. When in the first use state (such as a use state shown in FIG. 3), the first abutment end E1 of the first through-chute 1210 abuts against the first locking member 131 of the torque fixing assembly 13. When in the second use state (such as a use state shown in FIG. 4), the second abutment end E2 of the first through-chute 1210 abuts against the first locking member 131 of the torque fixing assembly 13. In detail, a use state of the electronic device 2 switches from the second use state to the first use state in response to the operation of the support device 1 by the users. The support frame 12 rotates along the axis A such that the second arc surface portion 121 slides relative to the first arc surface portion 111 of the base 11. At this time, the first through-chute 1210 is driven by the second arc surface portion 121 so that the first abutment end E1 moves toward the first locking member 131 until the first abutment end E1 abuts against the first locking member 131. Similarly, a use state of the electronic device 2 switches from the first use state to the second use state in response to the operation of the support device 1 by the users. The support frame 12 rotates along the axis A such that the second arc surface portion 121 slides relative to the first arc surface portion 111 of the base 11. At this time, the first through-chute 1210 is driven by the second arc surface portion 121 so that the second abutment end E2 moves toward the first locking member 131 until the second abutment end E2 abuts against the first locking member 131. It should be particularly noted that, if the user adjusts an angle between the display surface 20 of the electronic device 2 and the base 11 into a use state other than the first use state and the second use state, that is, an angle between the display surface 20 of the electronic device 2 and the base 11 is adjusted into a use state of between 90 degrees and 150 degrees, both of the first abutment end E1 and the second abutment end E2 of the first through-chute 1210 do not abut against the first locking member 131 of the torque fixing assembly 13. That is, under such use states, the first locking member 131 is located between the first abutment end E1 and the second abutment end E2.

As shown in FIG. 1, FIG. 2 and FIG. 5, the second arc surface portion 121 of the present embodiment further includes at least one frame-shaped buffer member 1211. The frame-shaped buffer member 1211 is disposed between the first through-chute 1210 and the friction member 133 of the torque fixing assembly 13. The first locking member 131 of the torque fixing assembly 13 passes through the friction member 133, the frame-shaped buffer member 1211 and the first through-chute 1210 and is locked to the second locking member 132. The effect of the frame-shaped buffer member 1211 of the present embodiment is that the friction member 133 of the torque fixing assembly 13 does not directly contact the first through-chute 1210, and the friction member 133 is prevented from wearing the first through-chute 1210 when the second arc surface portion 121 repeatedly slides relative to the first arc surface portion 111.

It should be particularly noted that in the present embodiment, a quantity of the torque fixing assemblies 13 is two. In order to correspond to the quantity of the torque fixing assemblies, two first through-chutes 1210 and two frame-shaped buffer members 1211 are also disposed in the meantime. The first through-chutes 1210 are located at two opposite sides of the second arc surface portion 121, respectively. The torque fixing assemblies 13 are respectively disposed at the corresponding first through-chute 1210. The frame-shaped buffer members 1211 are respectively located between the corresponding torque fixing assembly 13 (the corresponding friction member 133) and the corresponding first through-chute 1210. That is, when the first locking members 131 of the torque fixing assemblies 13 sequentially pass through the corresponding friction member 133, the corresponding frame-shaped buffer member 1211 and the corresponding first through-chute 1210 and are locked to the corresponding second locking members 132, the torque fixing assemblies 13, the first through-chutes 1210, and the frame-shaped buffer members 1211 are also located at two opposite sides of the first arc surface portion 111.

Figure 6:
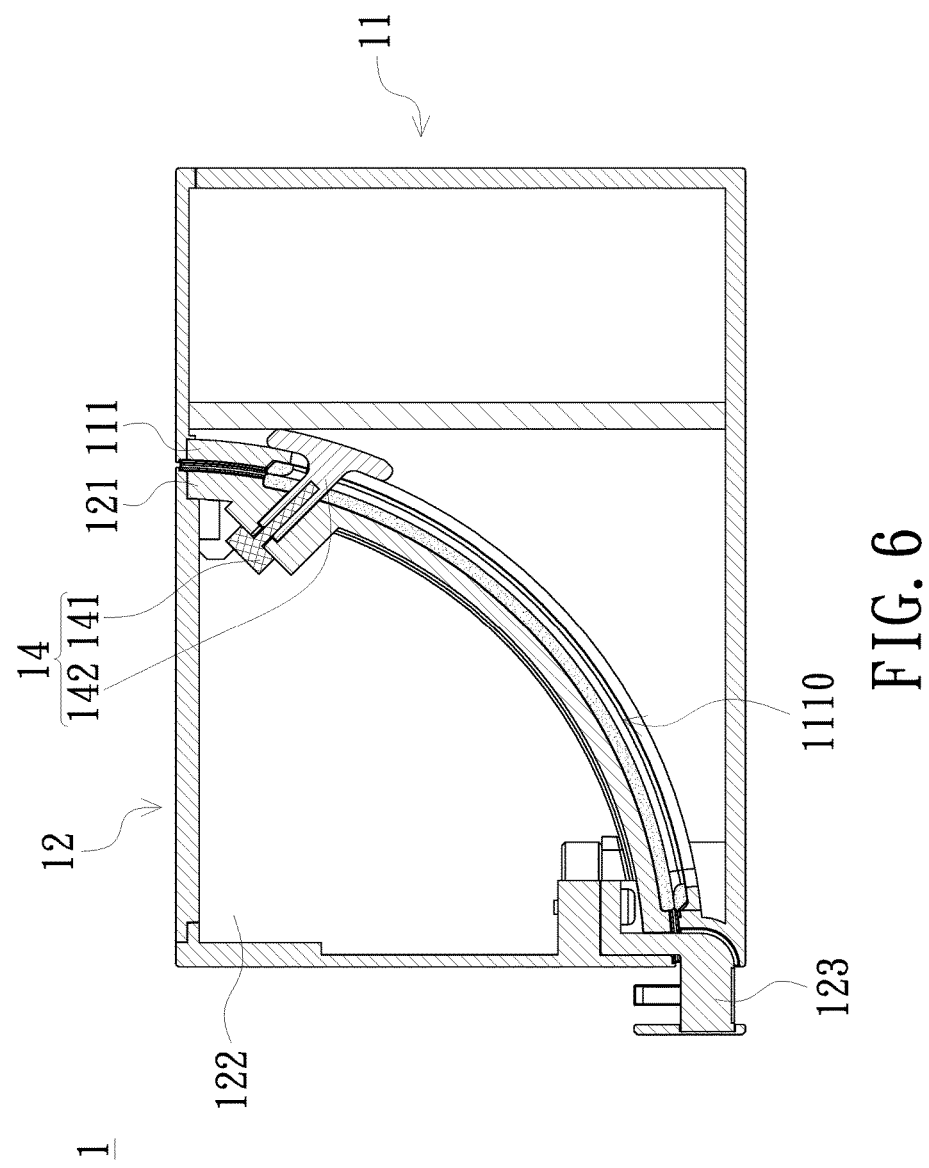
FIG. 6 is a schematic cross-sectional view taken along line B-B shown in FIG. 1.

FIG. 6 is a schematic cross-sectional view taken along line B-B shown in FIG. 1. As shown in FIG. 1, FIG. 2 and FIG. 6, the support device 1 of the present embodiment further includes a fixing assembly 14. The fixing assembly 14 is disposed at the first arc surface portion 111 of the base 11 and the second arc surface portion 121 of the support frame 12. The fixing assembly 14 is located between the torque fixing assemblies 13. The base 11 and the support frame 12 are fixed to each other through the fixing assembly 14. The effect of the fixing assembly 14 of the present embodiment is that, when the second arc surface portion 121 of the support frame 12 slides relative to the first arc surface portion 111 of the base 11, the fixing assembly 14 can allow the support frame 12 to slide stably relative to the base 11 without deviating from each other. In addition, it should be particularly noted that the torque fixing assemblies 13 of the present embodiment also has an effect of fixing the base 11 and the support frame 12 to each other. However, the torque fixing assemblies 13 mainly allow torque to be generated when the second arc surface portion 121 of the support frame 12 slides relative to the first arc surface portion 111 of the base 11.

As shown in FIG. 1, FIG. 2 and FIG. 6, the fixing assembly 14 of the present embodiment includes a first fixing member 141 and a second fixing member 142. The first arc surface portion 111 of the base 11 and the second arc surface portion 121 of the support frame 12 are located between the first fixing member 141 and the second fixing member 142. The first fixing member 141 of the fixing assembly 14 is disposed through the second arc surface portion 121 of the support frame 12 and is fixed to each other with the second fixing member 142 which is disposed through the first arc surface portion 111 of the base 11.

As shown in FIG. 1, FIG. 2 and FIG. 6, the first arc surface portion 111 of the base 11 of the present embodiment includes a second through-chute 1110. The second fixing member 142 of the fixing assembly 14 passes through the second through-chute 1110 located at the first arc surface portion 111 and is fixed to each other with the first fixing member 141. The second through-chute 1110 of the first arc surface portion 111 is located between the first through-chutes 1210 of the second arc surface portion 121. When the support frame 12 rotates along the axis A such that the second arc surface portion 121 slides relative to the first arc surface portion 111, the first fixing member 141, which is disposed through the second arc surface portion 121, drives the second fixing member 142 to move along the second through-chute 1110 of the first arc surface portion 111.

As shown in FIG. 1, FIG. 2 and FIG. 6, the support device 1 of the present embodiment further includes a buffer member 15. The buffer member 15 is disposed between the second through-chute 1110 of the first arc surface portion 111 and the second arc surface portion 121. The second fixing member 142 of the fixing assembly 14 passes through the second through-chute 1110 and the buffer member 15 and is fixed to each other with the first fixing member 141. The effect of the buffer member 15 of the present embodiment is that the second arc surface portion 121 of the support frame 12 does not directly contact the second through-chute 1110, and the second arc surface portion 121 is prevented from being worn when the second arc surface portion 121 repeatedly slides relative to the first arc surface portion 111.

As shown in FIG. 1 to FIG. 6, the support frame 12 of the present embodiment further includes a support portion 122 and a bearing portion 123. The second arc surface portion 121 of the support frame 12 and the bearing portion 123 are connected to two opposite sides of the support portion 122, respectively. A part of each of the torque fixing assemblies 13 is located between the support portion 122 and the second arc surface portion 121. In detail, there is an accommodation space S between the second arc surface portion 121 and the support portion 122. The first locking member 131 and the friction member 133 of each of the torque fixing assemblies 13 are located in the accommodation space S defined by the second arc surface portion 121 and the support portion 122. That is, the second locking member 132 of each of the torque fixing assemblies 13 is not located in the accommodation space S defined by the second arc surface portion 121 and the support portion 122. The support portion 122 of the present embodiment is used for supporting the electronic device 2 in a first direction D1. The bearing portion 123 is used for bearing the electronic device 2 in a second direction D2. The first direction D1 and the second direction D2 are not parallel to each other. In the present embodiment, the first direction D1 and the second direction D2 are, for example, perpendicular to each other, but the present invention is not limited thereto.

Figure 7:
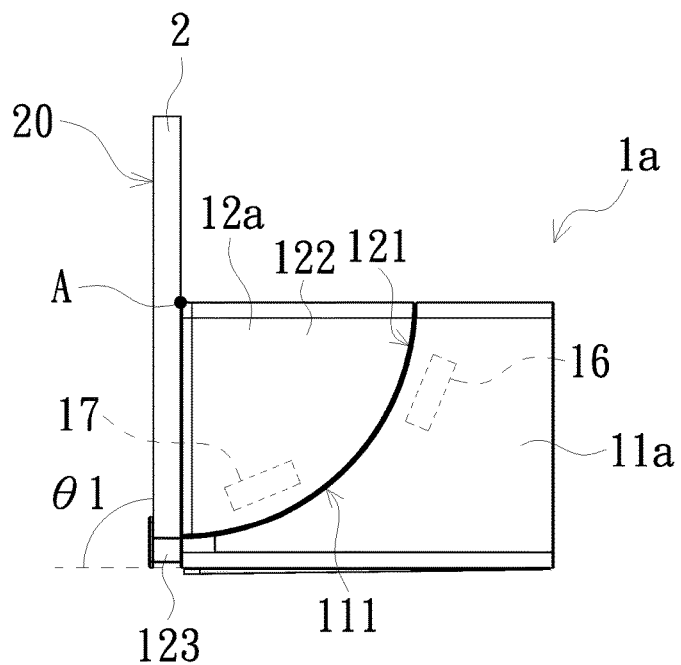
FIG. 7 is a schematic structural diagram of a support device in a use state according to another embodiment of the present invention.
Figure 8:
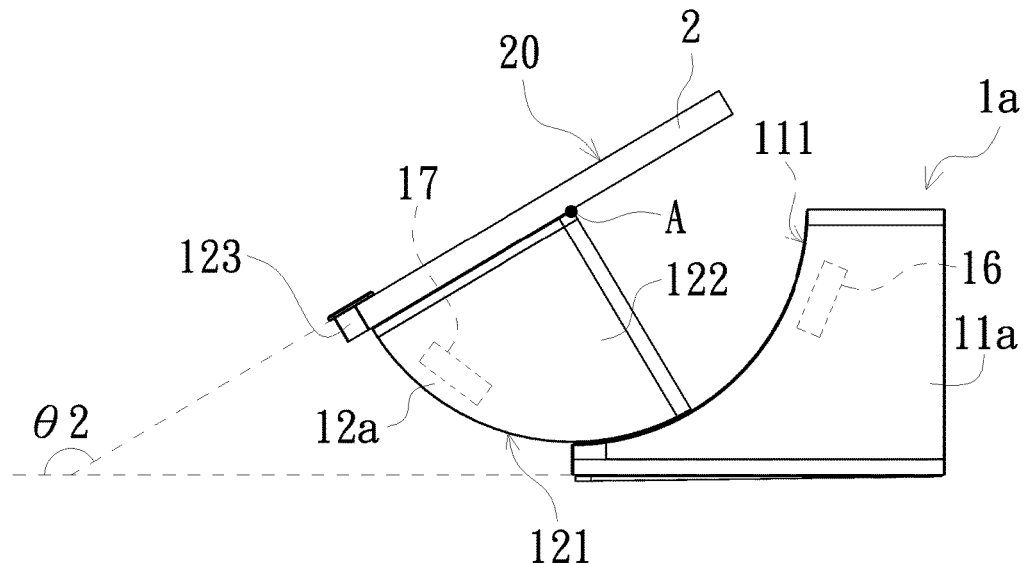
FIG. 8 is a schematic structural diagram of the support device shown in FIG. 7 in another use state.

FIG. 7 is a schematic structural diagram of a support device in a use state according to another embodiment of the present invention. FIG. 8 is a schematic structural diagram of the support device shown in FIG. 7 in another use state. As shown in FIG. 7 and FIG. 8, a support device 1a of the present embodiment is similar to the support device 1 shown in FIG. 1 to FIG. 6. The difference lies in that a base 11a of the support device 1a of the present embodiment further includes a first speaker 16, and a support frame 12a further includes a second speaker 17. The first speaker 16 is correspondingly disposed at the first arc surface portion 111 of the base 11a. The second speaker 17 is correspondingly disposed at the second arc surface portion 121 of the support frame 12a. As shown in FIG. 7, when the support frame 12a and the base 11a overlap each other without being staggered, the first speaker 16 and the second speaker 17 are both hidden without being exposed. As shown in FIG. 8, when the support frame 12a rotates along the axis A such that the first arc surface portion 111 and the second arc surface portion 121 are staggered to each other, at least one of the first speaker 16 and the second speaker 17 is exposed. It should be particularly noted that it is only one of the embodiments of the present invention that the support device has two speakers. In other embodiments, the support device may be equipped with only one speaker, and this speaker may be randomly disposed at the base or the support frame.

In summary, in the electronic device of the embodiment of the present invention and in the support device of the embodiment of the present invention, the base has the first arc surface portion, and the support frame has the second arc surface portion. When the electronic device is placed at the support frame, in response to the user's operation, the support frame is configured to rotate along the axis such that the second arc surface portion slides relative to the first arc surface portion and the electronic device switches between different use states. In addition, through the torque fixing assembly disposed at the first arc surface portion and the second arc surface portion, the second arc surface portion is configured to rub against the torque fixing assembly to generate torque when sliding relative to the first arc surface portion, so as to adjust the angle between the display surface of the electronic device and the user. The support device of the embodiment of the present invention has a simple structure and is easy for the users to operate. Under the circumstance of a simple structure, the service life is also greatly improved.

Those described above are merely preferred embodiments of the present invention, and the scope of the present invention cannot be limited thereto. That is, the simple equivalent changes and modifications made according to the claims and the specification of the present invention still fall within the scope of the patent of the present invention. In addition, any embodiment or claim of the present invention does not have to achieve all the objectives, advantages or features disclosed by the present invention. Moreover, the abstract and the title are only used for assisting the search for patent documents and are not intended to limit the scope of the present invention. Furthermore, terms such as "first" and "second" mentioned in the specification or the claims are only used for naming elements or distinguishing different embodiments or ranges, and are not intended to limit the upper or lower limit of the quantity of elements.

What is claimed is:

1. A support device, adapted to support an electronic device, wherein the electronic device has a display surface, and the support device comprises:
    a base, comprising a first arc surface portion;
    a support frame, adapted to support the electronic device, wherein the support frame comprises a second arc surface portion opposite to the first arc surface portion and an axis, and the support frame rotates along the axis such that the second arc surface portion slides relative to the first arc surface portion and the electronic device switches between a first use state and a second use state; and
    at least one torque fixing assembly, disposed at the first arc surface portion and the second arc surface portion, wherein, when the second arc surface portion slides relative to the first arc surface portion, the second arc surface portion rubs against the torque fixing assembly and torque is generated; and
    a fixing assembly, disposed at the first arc surface portion and the second arc surface portion, the fixing assembly is located at a side of the torque fixing assembly, and the support frame is movably fixed to the base through the fixing assembly;
    wherein the fixing assembly comprises a first fixing member and a second fixing member, the first arc surface portion and the second arc surface portion are located between the first fixing member and the second fixing member, and the first fixing member is disposed through the second arc surface portion and is fixed to each other with the second fixing member which is disposed through the first arc surface portion.

2. The support device according to claim 1, wherein the torque fixing assembly comprises a first locking member, a second locking member, and a friction member, the friction member is located between the first locking member and the second arc surface portion, the first arc surface portion is located between the second locking member and the second arc surface portion, and the first locking member passes through the friction member and the second arc surface portion and is locked to the second locking member, which passes through the first arc surface portion, so that the friction member abuts against the second arc surface portion and the first arc surface portion abuts against the second arc surface portion.

3. The support device according to claim 2, wherein the second arc surface portion comprises at least one first through-chute, the first locking member passes through the friction member and the first through-chute and is locked to the second locking member, the first through-chute has a first abutment end and a second abutment end, when in the first use state, the first abutment end abuts against the first locking member, and when in the second use state, the second abutment end abuts against the first locking member.

4. The support device according to claim 3, wherein the second arc surface portion further comprises at least one frame-shaped buffer member, the frame-shaped buffer member is disposed between the first through-chute and the friction member, and the first locking member passes through the friction member, the frame-shaped buffer member and the first through-chute and is locked to the second locking member.

5. The support device according to claim 4, wherein a quantity of the at least one torque fixing assembly is two, a quantity of the at least one first through-chute is two, a quantity of the at least one frame-shaped buffer member is two, the first through-chutes are disposed at two opposite sides of the second arc surface portion, respectively, the torque fixing assemblies are respectively disposed at the corresponding first through-chute, and the frame-shaped buffer members are respectively located between the corresponding torque fixing assembly and the corresponding first through-chute.

6. The support device according to claim 1, wherein the first arc surface portion comprises a second through-chute, the second fixing member passes through the second through-chute and is fixed to each other with the first fixing member, and when the support frame rotates along the axis such that the second arc surface portion slides relative to the first arc surface portion, the first fixing member, which is disposed through the second arc surface portion, drives the second fixing member to move along the second through-chute.

7. The support device according to claim 6, further comprising a buffer member, wherein the buffer member is disposed between the second through-chute of the first arc surface portion and the second arc surface portion, and the second fixing member of the fixing assembly passes through the second through-chute and the buffer member and is fixed to each other with the first fixing member.

8. The support device according to claim 1, wherein the support frame further comprises a support portion and a bearing portion, the second arc surface portion and the bearing portion are connected to two opposite sides of the support portion, respectively, a part of the torque fixing assembly is located between the support portion and the second arc surface portion, the support portion is used for supporting the electronic device in a first direction, the bearing portion is used for bearing the electronic device in a second direction, and the first direction and the second direction are not parallel to each other.

9. The support device according to claim 1, wherein, when in the first use state, an angle between the display surface and the base is a first angle, and when in the second use state, an angle between the display surface of the electronic device and the base switches from the first angle to a second angle.

10. The support device according to claim 1, wherein the base further comprises a first speaker, which is correspondingly disposed at the first arc surface portion.

11. The support device according to claim 10, wherein the support frame further comprises a second speaker, which is correspondingly disposed at the second arc surface portion.

12. The support device according to claim 11, wherein, when the support frame and the base overlap each other without being staggered, the first speaker and the second speaker are both hidden without being exposed.

13. The support device according to claim 11, wherein, when the support frame rotates along the axis such that the first arc surface portion and the second arc surface portion are staggered to each other, at least one of the first speaker and the second speaker is exposed.

* * * * *